United States Patent [19]

Pullukat et al.

[11] Patent Number: 4,754,007

[45] Date of Patent: Jun. 28, 1988

[54] COPOLYMERIZATION OF ETHYLENE

[75] Inventors: Thomas J. Pullukat, Hoffman Estates, Ill.; Michael W. Lynch, Flourtown, Pa.; Mitsuzo Shida, Barrington, Ill.

[73] Assignee: Enron Chemical Company, Rolling Meadows, Ill.

[21] Appl. No.: 873,855

[22] Filed: Jun. 11, 1986

Related U.S. Application Data

[63] Continuation-in-part of Ser. No. 708,742, Mar. 8, 1985, abandoned, which is a continuation-in-part of Ser. No. 598,256, Apr. 9, 1984, abandoned.

[51] Int. Cl.$^4$ ................................................ C08F 4/02
[52] U.S. Cl. ..................................... 526/130; 526/154
[58] Field of Search ............... 526/123, 130, 154, 348, 526/348.1, 348.2, 348.3, 348.4, 348.5, 348.6

[56] References Cited

U.S. PATENT DOCUMENTS

| | | | |
|---|---|---|---|
| 3,087,917 | 4/1963 | Scoggin | 526/67 |
| 3,225,021 | 12/1965 | Erchak, Jr. | 260/93.7 |
| 3,428,619 | 2/1969 | Hawkins et al. | 528/501 |
| 3,780,011 | 12/1973 | Pullukat et al. | 260/94.9 D |
| 4,068,054 | 1/1978 | Willcox | 526/74 |
| 4,128,607 | 12/1978 | Shiomura et al. | 526/348 X |
| 4,190,614 | 2/1980 | Ito et al. | 526/348 X |
| 4,212,961 | 7/1980 | Kobayashi et al. | 526/151 |
| 4,294,947 | 10/1981 | Doerk | 526/348.6 |
| 4,424,321 | 1/1984 | Tsubaki | 526/348.2 |
| 4,481,342 | 11/1984 | Invernizzi | 526/348.2 |

FOREIGN PATENT DOCUMENTS

| | | |
|---|---|---|
| 853414 | 11/1960 | United Kingdom . |
| 1283391 | 7/1972 | United Kingdom . |
| 2051094 | 1/1981 | United Kingdom . |
| 2068007 | 6/1983 | United Kingdom . |
| 2125417 | 3/1984 | United Kingdom . |

OTHER PUBLICATIONS

Shida et al., *Polymer Engineering and Science*, vol. 11, No. 2, pp. 124–128 (1971).
"Something New in Polyethylene: Low-Density PE", Plastics World, Dec. 1979, p. 86.
"New Polyrthylenes Promise Tougher and Clearer Films", Package Engineering, Feb. 1980.

*Primary Examiner*—Paul R. Michl
*Attorney, Agent, or Firm*—Marshall, O'Toole, Gerstein, Murray & Bicknell

[57] ABSTRACT

Ethylene is copolymerized or interpolymerized with at least one olefinic comonomer having about 3 to 18 carbon atoms to produce linear low density polyethylene copolymers and terpolymers in a slurry process using liquid propane as the diluent. The copolymer products have desirable physical properties including relatively narrow molecular weight distributions and low elasticities.

24 Claims, 1 Drawing Sheet

COPOLYMERIZATION OF ETHYLENE

CROSS-REFERENCE TO RELATED APPLICATIONS

This is a continuation-in-part of copending, commonly assigned application Ser. No. 708,742 filed Mar. 8, 1985, now abandoned, which is a continuation-in-part of copending, commonly assigned application Ser. No. 598,256 filed Apr. 9, 1984, now abandoned.

BACKGROUND OF THE INVENTION

1. Field of the Invention

This invention relates to an improvement in methods of copolymerizing ethylene with other olefins and, in particular, this invention relates to an improved method of copolymerizing ethylene and another olefin to obtain linear low density polyethylene copolymers.

2. Description of the Prior Art

U.S. Pat. No. 3,087,917 issued Apr. 30, 1963 in the name of J.S. Scoggin discloses a process of polymerizing ethylene in the presence of a liquid reaction medium and a catalyst to produce polymers in the form of solid particles which are dispersed in the liquid reaction medium as they are formed. This type of reaction method is known to those skilled in the art as a "slurry" polymerization process and is widely used for the production of high density polyethylene.

Such slurry processes conventionally use isobutane, pentane, hexane or a similar saturated aliphatic hydrocarbon as the liquid reaction medium (also referred to as the "diluent"). However, when applied to the production of ethylene/olefin copolymers, and especially the type of copolymer known as "linear low density polyethylene (LLDPE)", conventional slurry processes, including the so-called "particle form" process, exhibit certain disadvantages. For example, the operable reaction temperature is limited because, at high temperatures, linear low density polyethylene goes into solution, and heat transfer and production rates are adversely affected. Furthermore, complete separation of the comonomer and the reaction medium is difficult, and product copolymers generally exhibit relatively broad molecular weight distributions and contain undesirably high amounts of wax. The bulk density of copolymers produced by prior slurry processes tends to be low.

SUMMARY OF THE INVENTION

It is an object to the invention to overcome one or more of the problems described above.

According to the invention, ethylene is copolymerized or interpolymerized with at least one other 1-olefin in the presence of a catalyst and liquid propane to produce copolymers or terpolymers in the form of solid particles. The products generally have densities in the range of about 0.90 to about 0.945 g/cc, inclusive. The inventive method is especially suitable for the production of so-called linear low density polyethylene copolymers.

The inventive method is more economical than slurry processes using isobutane, hexane or other liquid diluents, and provides product copolymers having more desirable physical properties.

Further objects and advantages will be apparent to those skilled in the art from the following detailed description taken in conjunction with the Figures and the appended claims.

DETAILED DESCRIPTION OF THE INVENTION

Figure 1:
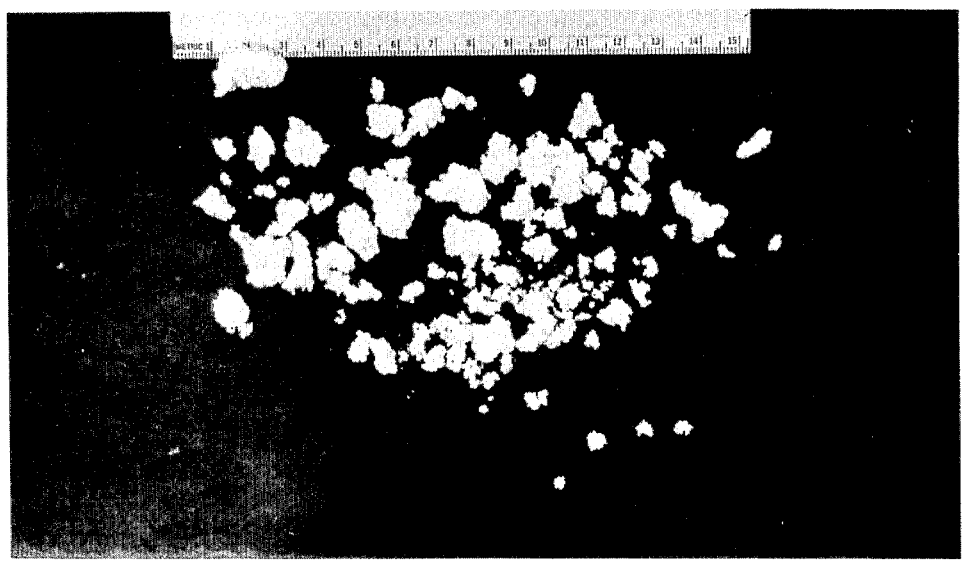
FIG. 1 is a photograph of an ethylene/1-hexene copolymer with a density of about 0.922 g/cc made in the prior art slurry process using isobutane diluent (Example D); and, FIG. 2 is a photograph of an ethylene/1-hexene copolymer with a density of about 0.922 g/cc made in the inventive slurry process using propane diluent (Example I).

According to the present invention, ethylene is copolymerized or interpolymerized with at least one olefinic comonomer having between about 3 and 18 carbon atoms in the presence of a polymerization catalyst and liquid propane. The invention is especially suitable for the production of linear low density polyethylene copolymers, which are ethylene/1-olefin copolymers having a substantial absence of long chain branching and a high degree of short chain branching, with densities in the range of about 0.90 to about 0.945 g/cc, inclusive.

Various advantages derive from the improved method of the invention. Propane is less expensive and has a lower heat of vaporization than liquid diluents used in prior slurry polymerization processes, such as isobutane and hexane, for example. In the so-called "particle form" process, the use of propane allows operation of the reactor without fouling of the reactor at a higher temperature during linear low density polymer synthesis than does the use of isobutane. Since propane is more volatile, there is more residual sensible heat remaining, which allows more efficient flash separation of the product polymer from the diluent.

Butene and hexene are ideal comonomers for the copolymerization of ethylene according to the invention. In the case of butene, nearly complete separation of the polymer from the reaction medium and the comonomer is possible with simple flash evaporation. In the case of 1-hexene, additional drying may be necessary, but the load on the dryer is much less than when isobutane or another prior art diluent is used.

Since propane is a relatively poor solvent for linear low density polyethylene, the viscosity of the product/reaction medium slurry is low and thus the reaction mixture is easy to mix and provides for ready removal of the heat of polymerization. With the use of propane, the polymerization reaction can be conducted at a relatively high temperature without fouling of the reactor. Coincidentally, such high temperatures (e.g. 75°–85° C., and preferably 76°–82° C.) lead to relatively high catalyst reactivities.

Additionally, it has surprisingly been found that copolymers and terpolymers produced in the slurry process using propane as the liquid diluent exhibit relatively low elasticities, as measured by $L_s$ values, typically below 3.0, as compared to prior art values of greater than 50, and relatively narrow molecular weight distributions, as measured by rheological dispersity ($R_D$) as described in Shida et al, *Polymer Engineering and Science*, Vol. 11, No. 2, pages 124–128 (1971), the disclosure of which is hereby incorporated by reference. $R_D$ values of products made according to the invention are typically below 4.0, and most preferably below 3.5, as compared to prior art values greater than 4.0 and, in most cases, greater than 5.0. These properties of polymers made according to the invention provide desirably high impact properties.

Copolymer and terpolymer products of the invention are produced as discrete particles having substantially uniform size and shape characteristics, as opposed to products of the prior art which are highly non-uniform in size and shape, which are often produced in agglomerated form.

Comonomers useful in the inventive method comprise one or more 1-olefins having between about 3 and 18 carbon atoms. Suitable 1-olefin comonomers include, but are not limited to, propylene, 1-butene, 1-pentene, 1-hexene, 4-methyl-1-pentene, 1-octene, 1-decene, 1-dodecene, and 1-octadecene. The use of 1-butene, 1-hexene, or 1-octene to produce linear low density polyethylene is preferred.

As is well known in the art, the proportion of comonomer to ethylene may be varied to result in copolymer products having desired densities. For example, linear low density polyethylene may be prepared by selecting the proportion of butene, hexene or octene comonomers. For 1-butene, between about 1 and 10 mole percent of butene should be present in the copolymer product. The corresponding percentage for 1-hexene is about 0.5 to about 10 mole percent, and about 0.5 to about 5 mole percent in the case of 1-octene.

Linear low density polyethylene is conventionally defined as an ethylene/1-olefin copolymer having a density in the range of about 0.90 to about 0.945 g/cc, and having a substantial absence of long chain branching but a high degree of short chain branching.

The polymerization reaction may be carried out in any convenient type of reactor, such as a loop reactor, an autoclave, or a tubular reactor. The reaction is carried out under polymerizing conditions of temperature and pressure wherein the propane is maintained in the liquid state. The critical temperature of propane is about 96.8° C., and is independent of pressure. Therefore, it is preferred that the reaction be carried out below that temperature.

While the reaction may be carried out at lower temperatures, it has been found that operation at about 75° to 85° C. and, preferably, 76° to 82° C. leads to relatively high catalyst reactivity.

In general, the reaction is carried out with the catalyst dispersed in the liquid propane in the presence of ethylene and the comonomer. The copolymer or terpolymer product will be produced in the form of particles which are dispersed in the liquid propane as a slurry.

Some prior art processes for the production of low density copolymers of ethylene require a pre-polymerization step in which ethylene (in an amount of up to about 20% of the total ethylene and 1-olefin monomers to be polymerized) is pre-polymerized in the presence of a catalyst which is dispersed in a slurry in a liquid diluent prior to copolymerization with the 1-olefin comonomer. The pre-polymerization step provides a catalyst slurry which incorporates the catalyst and ethylene homopolymer.

Such a pre-polymerization step is neither necessary nor desired according to the present invention, in which propane diluent, catalyst, and ethylene and 1-olefin comonomers may be introduced simultaneously to the reaction vessel. Also, the copolymerization reaction of the invention is advantageously carried out in a single step, as opposed to two step copolymerization reactions of the prior art.

After the reaction is completed, the polymer is physically separated from the liquid propane and the comonomer by any suitable means. Since propane is relatively volatile as compared to prior diluents, it is highly suited for flash evaporation separation of the polymer from the diluent and comonomer. If the comonomer has a relatively high carbon number, additional drying may be required, but the load on the dryer is much less than in prior systems.

If desired, separation of the product from the diluent can be carried out by mechanical means, such as centrifuging, for example.

The high volatility of propane also contributes to ease in separating propane from higher molecular weight comonomers.

Since propane is a relatively poor solvent for the product, relatively high polymerization temperatures may be used without significant reactor fouling. Such fouling causes costly process interruptions and reactor down-time.

Any polymerization catalyst which is suitable for the production of ethylene/1-olefin copolymers of the type conventionally referred to as "linear low density polyethylene" and described herein can be used with this invention. Such catalysts include modified Ziegler catalysts, etc., but modified chromium catalysts, such as chromium oxide catalysts generally referred to as "Phillips-type" catalysts, are not suitable for the production of linear low density polyethylene copolymers, because they produce products having undesirably broad molecular weight distributions.

Suitable catalysts include those described in commonly assigned U.S. Pat. No. 4,530,913 issued July 23, 1985 in the name of Pullukat et al and corresponding British patent No. 2,068,007 issued June 22, 1983, U.S. Pat. No. 4,544,646 issued Oct. 1, 1985 in the names of Pullukat et al, and U.S. Pat. No. 4,499,198 issued Feb. 12, 1985 to Pullukat et al., the respective disclosures of which are hereby incorporated by reference.

Preferred catalysts are so-called Ziegler catalysts incorporating a transition metal selected from Groups IV, V and VI of the Periodic Table, used with an alkyl aluminum cocatalyst. Titanium containing catalysts are preferred, and catalysts useful in the invention may be supported or unsupported. The catalyst is preferably supported on an inorganic oxide such as silica, alumina, silica-alumina or the like.

Other preferred catalysts are those disclosed in Pullukat et al U.S. Pat. No. 4,499,198, and U.S. Pat. No. 4,544,646. Such catalysts are prepared by reacting one or more magnesium silylamide compounds such as disclosed in Pullukat et al U.S. Pat. No. 4,383,119 issued May 10, 1983, the disclosure of which is incorporated herein by reference, with at least one compound of a transition metal selected from Groups IIIB, IVB, VB and VIB of the fourth and fifth periods of the Periodic Table and Group VIIB and VIII of the fourth period of the Periodic Table. Such catalysts may optionally include one or more of a Lewis Acid, a Lewis Base, a hydrogen halide or zirconium tetrachloride in addition to the magnesium and titanium transition metal compound.

It is important that the transition metal compound of any catalyst used in the invention be chosen for its ability to produce linear low density polyethylene products having molecular weight distributions which are conventionally referred to in the art as "narrow". According to the invention, products having narrow molecular weight distributions characterized as having rheological dispersity ($R_D$) values of less than 4 are obtainable.

EXAMPLES

The following Examples will illustrate the method of the invention and its advantages over the prior art, but are not to be considered as limiting the invention in any way.

All polymerization testing in the following Examples was conducted utilizing a catalyst system prepared as described in Pullukat et al British patent No. 2,068,007 issued June 22, 1983 using hexamethyl disilazane (HMDS)-treated silica, a titanium concentration of 1.88 mMTi/g of silica and a triisobutyl aluminum (TIBAL) cocatalyst with an aluminum/titanium ratio of about 7.0.

The catalyst preparation procedure is described as follows:

1–2 grams of hexamethyl disilazane-treated Davison 952 grade silica was added to a nitrogen purged flask. After purging with nitrogen for 30 minutes, 20 ml of heptane were added to form a slurry.

To this slurry was added a 10% solution in heptane of 6.5 E Magala (Texas Alkyls). (6.5 E Magala is [(n-$C_4H_9)_2Mg]_{6.5} \cdot Al(C_2H_5)_3$.) The Magala was added to give 1.88 mM Mg/g silane treated silica.

The slurry was stirred for 30 minutes, and neat titanium tetrachloride ($TiCl_4$) was then added. The $TiCl_4$ was added in an amount to give 1.88 mMTi/g silane-treated silica. Hence, the molar magnesium to titanium ratio was 1.0.

The slurry was then stirred for 30 minutes, and 30 the catalyst was dried at 90° C. with a nitrogen flush. The catalyst was a dark brown free flowing powder with a titanium concentration of about 5.6 wt.%.

The polymerization testing procedure is described as follows:

A 2 liter reactor was purged with nitrogen and the desired temperature was obtained. Then under a nitrogen atmosphere the catalyst and cocatalyst solution were added to the reactor. The reactor was closed and 1000 ml of diluent (propane or isobutane) were pressured into the reactor. Next, a quantity of hydrogen gas was added as a molecular weight modifier (10–50 psi). Then, simultaneously, 1-hexene was measured by a sight glass and ethylene was added to a predetermined reactor pressure. This pressure was maintained by adding ethylene on demand to the reactor.

The temperature was controlled ±1.0° C. throughout a 1 hour polymerization. The reaction was terminated by shutting off the ethylene gas and venting the reactor through a remotely operated bottom valve into a catch-pot. Depending on the reaction medium used, the amount of 1-hexene used and the temperature, the polymer was, in some cases, very "wet" with diluent and 1-hexene, and was filtered to remove excess 1-hexene. The polymers were dried overnight. This time was sufficient to remove excess 1-hexene and to obtain a dry polymer.

Ethylene concentrations were controlled by varying the partial pressure of ethylene in the system. The vapor pressure data for propane and isobutane were taken from *Physical Properties of Hydrocarbons* by R. W. Gallant, Gulf Publishing, Houston, Texas.

Examples A-F (Comparative)

Several ethylene/1-hexene copolymerizations were conducted using isobutane as the diluent. The reactor temperature, partial pressure of ethylene, partial pressure of hydrogen, and 1-hexene concentrations are detailed in the Table, below.

Examples A-C were conducted at 54.4° C. while Examples D-F were conducted at 65.5° C. In each case, polymers isolated from the reaction mixtures were filtered to remove excess 1-hexene. Despite this procedure the polymers still contained considerable 1-hexene. When finally dry the polymers prepared at 65.5° C. were very sticky and had poor particle size and shape characteristics. (The product of Example D is shown in FIG. 1.) The polymers prepared at 54.4° C. had better particle size and shape characteristics and were less sticky. At this temperature, however, reactivity was quite low and a large amount of isobutane and 1-hexene remained in the polymer.

Polymer rheology on three samples indicate that the samples have fairly high elasticity, as evidenced by high $L_S$ values (a measure of elasticity). The polymers also have fairly broad (for Ziegler type catalysts) molecular weight distributions.

The polymerization temperature of about 54.4° C. is about the maximum polymerization temperature at which a polymer having a density of about 0.920 and a melt index (MI) of about 1–2 can be made with this catalyst without fear of fouling the reactor. Above this temperature polymer particle size and shape characteristics deteriorate rapidly.

Examples G-K (Invention)

Figure 2:
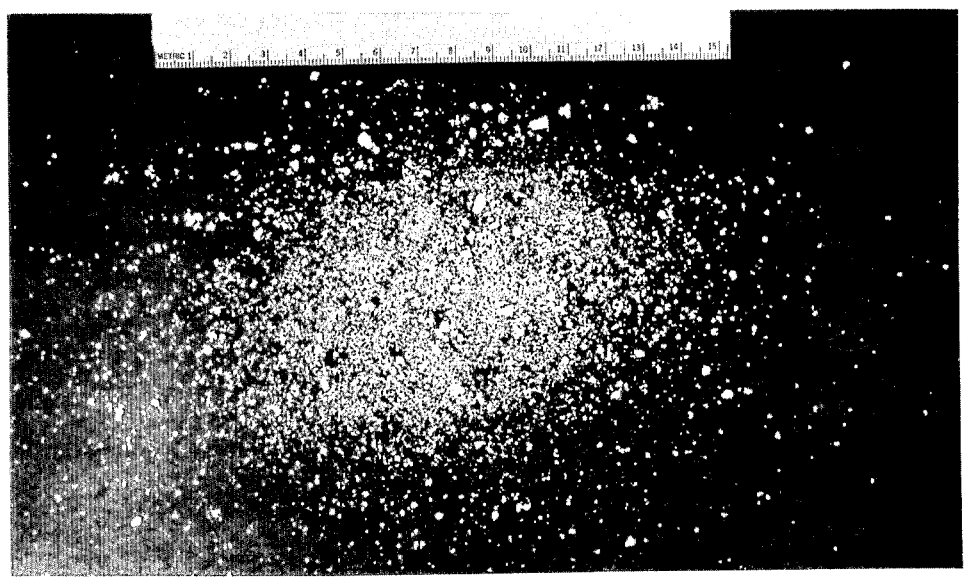

Several ethylene/1-hexene copolymerizations were conducted using propane as the liquid diluent. The reactor temperature, ethylene partial pressure, hydrogen partial pressure and 1-hexene concentration are detailed in the Table. The product of Example I is shown in FIG. 2.

Example L (Invention)

An ethylene/1-butene copolymerization was conducted in a liquid propane diluent using the catalyst as described above. The reaction conditions are given in the Table. The polymer had a density of between about 0.901 and 0.911 and was not sticky. The polymer particles had uniform size and shape characteristics.

The Inventive Examples G-L demonstrate that relatively high polymerization temperatures can be used without reactor fouling. For example, it is possible to polymerize at 82.2° C. without fouling with 30 wt.% 1-hexene in the reactor. The resultant polymers all have desirably uniform particle size and shape characteristics. The polymers produced using liquid propane as a diluent gave an additional unexpected advantage in the form of an improvement in polymer properties. The polymers produced according to the invention in a liquid propane diluent have narrower molecular weight distributions (low $R_D$) and low elasticities as evidenced by low $L_S$ values, as compared to the polymers produced using an isobutane diluent. Both are very desirable properties for an LLDPE film resin.

TABLE

| Example | Polym. Temp. °C. | Ethylene Partial Press. (psi) | Hydrogen Partial Press. (psi) | 1-Hexene Conc. (wt. %) | MI (g/10 min) | Density g/cc | $R_D$ (a = 2) | $L_S$ |
|---|---|---|---|---|---|---|---|---|
| ISOBUTANE DILUENT (CONTROL) | | | | | | | | |
| A | 54.4 | 65 | 40 | 20 | 1.4 | 0.931 | 5.5 | >50 |
| B | 54.5 | 120 | 50 | 40 | 1.3 | 0.929 | 4.7 | >50 |
| C | 54.4 | 120 | 50 | 40 | 1.0 | 0.930 | 4.7 | >50 |
| D | 65.5 | 64 | 25 | 30 | 2.1 | 0.922 | — | — |
| E | 65.5 | 65 | 25 | 20 | 0.67 | 0.925 | — | — |
| F | 65.5 | 80 | 50 | 40 | 0.52 | 0.918 | — | — |
| PROPANE DILUENT (INVENTION) | | | | | | | | |
| G | 65.5 | 65 | 20 | 20 | 2.9 | 0.925 | — | — |
| H | 71.1 | 75 | 15 | 20 | 0.65 | 0.927 | 3.0 | 2.0 |
| I | 71.1 | 55 | 15 | 30 | 0.79 | 0.922 | 3.3 | 2.8 |
| J | 76.6 | 55 | 10 | 30 | 0.34 | 0.928 | — | — |
| K | 82.2 | 60 | 10 | 30 | 0.25 | 0.928 | — | — |
| | | | | 1-Butene wt. % | | | | |
| L | 71.1 | 70 | 5 | 16 | 3.1 | 0.910 | — | — |

The foregoing detailed description is given for clearness of understanding only, and no unnecessary limitations should be understood therefrom, as modifications within the scope of the invention will be obvious to those skilled in the art.

GLOSSARY OF TERMS

HMDS—hexamethyl disilazane
LLDPE—linear low density polyethylene
$L_S$—a measure of elasticity
MI—melt index
$R_D$—rheological dispersity
TIBAL—triisobutyl aluminum

We claim:

1. A method of making linear low density polyethylene, said method consisting of the single step of copolymerizing or interpolymerizing reactants consisting essentially of gaseous ethylene and at least one liquid 1-olefin comonomer having between about 3 and 18 carbon atoms, inclusive, in the presence of an inorganic oxide-supported polymerization catalyst containing a compound of a catalytically active transition metal other than chromium selected from Groups IV, V and VI of the Periodic Table dispersed in liquid propane at a temperature and pressure and proportion of said 1-olefin to said ethylene selected whereby linear low density polyethylene product having a density in the range of about 0.90 to about 0.945 g/cc, inclusive, is formed as discrete, substantially uniformly sized solid particles dispersed in said liquid propane and having a narrow molecular weight distribution as measured by an $R_D$ value of 3.3 or below.

2. The method of claim 1 wherein said comonomer is selected from the group consisting of propylene, 1-butene, 1-pentene, 1-hexene, 4-methyl-1-pentene, 1-octene, 1-decene, 1-dodecene and 1-octadecene.

3. The method of claim 2 wherein said comonomer is 1-butene.

4. The method of claim 3 wherein the proportion of said 1-butene to said ethylene is selected to provide between about 1 and 10 mole percent 1-butene in said product.

5. The method of claim 2 wherein said comonomer is 1-hexene.

6. The method of claim 5 wherein the proportion of said 1-hexene to said ethylene is selected to provide between about 0.5 and 10 mole percent 1-hexene in said product.

7. The method of claim 2 wherein said comonomer is 1-octene.

8. The method of claim 7 wherein the proportion of said 1-octene to said ethylene is selected to provide between about 0.5 and 5 mole percent 1-octene in said product.

9. The method of claim 1 wherein said product is separated from said diluent following said reaction by means of evaporation of said diluent.

10. The method of claim 9 wherein said evaporation is carried out by flash drying under conditions of reduced pressure.

11. A method of making linear low density polyethylene, said method consisting of the single step of copolymerizing ethylene and one 1-olefin comonomer having between about 3 and 18 carbon atoms, inclusive, in the presence of an inorganic oxide-supported polymerization catalyst containing a compound of a catalytically active transition metal other than chromium selected from Groups IV, V and VI of the Periodic Table dispersed in liquid propane at a temperature below the critical temperature of propane and wherein said temperature, the pressure and proportion of said 1-olefin to said ethylene are selected whereby linear low density polyethylene product having a density in the range of about 0.90 to about 0.945 g/cc, inclusive, is formed as discrete solid particles dispersed in said liquid propane and having low elasticity characteristics, and a narrow molecular weight distribution as measured by an RD value of 4 or less.

12. The method of claim 10 wherein said comonomer is selected from the group consisting of propylene, 1-butene, 1-pentene, 1-hexene, 4-methyl-1-pentene, 1-octene, 1-decene, 1-dodecene and 1-octadecene.

13. The method of claim 11 wherein said comonomer is 1-butene.

14. The method of claim 13 wherein the proportion of said 1-butene to said ethylene is selected to provide between about 1 and 10 mole percent 1-butene in said product.

15. The method of claim 12 wherein said comonomer is 1-hexene.

16. The method of claim 15 wherein the proportion of said 1-hexene to said ethylene is selected to provide between about 0.5 and 10 mole percent 1-hexene in said product.

17. The method of claim 12 wherein said comonomer is 1-octene.

18. The method of claim 17 wherein the proportion of said 1-octene to said ethylene is selected to provide between about 0.5 and 5 mole percent 1-octene in said product.

19. The method of claim 10 wherein said product is separated from said diluent following said reaction by means of evaporation of said diluent.

20. The method of claim 19 wherein said evaporation is carried out by flash drying under conditions of reduced pressure.

21. The method of claim 1 wherein said transition metal is selected from Groups IV and V of the Periodic Table.

22. The method of claim 21 wherein said transition metal is titanium.

23. The method of claim 11 wherein said transition metal is selected from Groups IV and V of the Periodic Table.

24. The method of claim 23 wherein said transition metal is titanium.

* * * * *